United States Patent [19]

Kamleitner

[11] Patent Number: 4,513,724
[45] Date of Patent: Apr. 30, 1985

[54] FUEL INJECTION TIMER
[75] Inventor: Ewald Kamleitner, Friedrichshafen, Fed. Rep. of Germany
[73] Assignee: MTU Motoren und Turbinen-Union Friedrichshafen GmbH, Friedrichshafen, Fed. Rep. of Germany
[21] Appl. No.: 358,440
[22] Filed: Mar. 15, 1982
[30] Foreign Application Priority Data
  Mar. 13, 1981 [DE] Fed. Rep. of Germany ....... 3109655
[51] Int. Cl.³ ............................................. F02M 39/00
[52] U.S. Cl. ........................................ 123/500; 464/1
[58] Field of Search ................... 123/500, 501; 464/1, 464/3

[56] References Cited
FOREIGN PATENT DOCUMENTS 322121   6/1920  Fed. Rep. of Germany .......... 464/1
  2727121 12/1978  Fed. Rep. of Germany ...... 123/501
  264857   6/1927  United Kingdom .................... 464/3

Primary Examiner—Charles J. Myhre
Assistant Examiner—Carl Stuart Miller
Attorney, Agent, or Firm—Jerold M. Forsberg

[57] ABSTRACT

A fuel injection timer for internal combustion engines, wherein a shaft of a fuel injection pump is rotated relative to a drive shaft connected to the internal combustion engine as a function of the rotational speed of the engine. Oscillating bodies are disposed between first tracks connected to the drive shaft and second tracks connected with a shaft of the fuel injection pump. The first and second tracks are disposed in opposed pairs and the oscillating bodies each transmit a portion of the pump drive torque and move from an inner end position at a lower rotational speed of the engine to an outer end position at a maximum rotational speed of the engine under the influence of centrifugal forces and counteracting spring forces. A slope formed by the tracks affects the relative torque between the two shafts with the displacement curve of the injection time which corresponds to a favorable combustion cycle. Several of the track pairs have a non-uniform slope pattern over their displacement path, with a segment of the displacement path being constructed as a slight slope so as to cause self-locking between the tracks and the corresponding oscillating bodies. These segments of the individual track pairs are each associated with rotational angles of the shafts at which high torque peaks occur or at which there is a danger of oscillation for the injection timer as a result of resonances.

5 Claims, 3 Drawing Figures

FUEL INJECTION TIMER

BACKGROUND OF THE INVENTION

The present invention relates to a timer arrangement and, more particularly, to a fuel injection timer for internal combustion engines, wherein a shaft of a fuel injection pump is rotated relative to a drive shaft connected to the internal combustion engine as a function of a rotational speed of the internal combustion engine.

A fuel injection timer of the aforementioned type may be provided with a plurality of oscillating bodies disposed between first tracks connected to a drive shaft of an internal combustion engine and a second track connected to a fuel injection pump shaft, with the tracks geing disposed in opposed pairs, and with the oscillating bodies each transmitting a portion of a drive torque of the fuel pump and moving from an inner end position at a low engine rotational speed to an outer end position at a maximum rotational speed under an influence of centrifugal forces and counteracting spring forces resulting in the oscillating bodies being displaced over a distance and, thereby, by virtue of a slope created by the tracks, effecting a relative rotation between the two shafts with a timing curve for a fuel injection which corresponds to a favorable combustion cycle for the internal combustion engine.

In injection timers wherein the oscillating bodies, functioning as flyweights, are connected, to reduce the load, in parallel, the oscillating bodies transmit only a portion of the torque. A disadvantage of this type of injection timer resides in the fact that, if the tracks of the injection timer are only provided with a relatively gentle or small slope, only a relatively small rotational angle may be produced. If the slope of the tracks is increased, the rotational angle can be increased; however, at the same time, no automatic locking between the tracks and the oscillating bodies or flyweights exists so that a displacement of the flyweights or oscillating bodies inwardly is caused by the high torque peaks of the fuel injection pump, especially at high rotational speeds and loads on the internal combustion engine thereby resulting in large quantities of fuel being injected. A disadvantage of the displacement of the flyweights resides in the fact that an unfavorable change in the timing curve for the fuel injection results, which timing curve is required to achieve favorable combustion in the respective cylinders of the internal combustion engine.

If the tracks and associated oscillating bodies or flyweights are not constructed so as to be automatically self-locking or self-suppressing, when the natural frequencies of the injection timer correspond to excitation frequencies, oscillation state may occur in the injection timer which cause premature destruction of the tracks and the oscillating bodies or flyweights and also cause undesirable displacement of the oscillating bodies or flyweights inwardly and outwardly whereby a change in the timing curve is likewise produced.

SUMMARY AND OBJECTS OF THE INVENTION

The aim underlying the present invention essentially resides in providing an injection timer having oscillating bodies or flyweights connected in parallel which is adapted to produce a large rotational angle between a shaft of the fuel injection pump and a drive shaft connected to the internal combustion engine under at least specific operating conditions, and which is adapted to automatically suppress at torsional movement between the two shafts.

In accordance with advantageous features of the present invention, several of the track pairs of the injection timer are provided with slopes which are nonuniform over their displacement paths and which differ from displacement curves of the other pairs of tracks so that a portion of the displacement path is made with a slope which is slight and causes an automatic locking between the tracks and associated oscillating bodies or flyweights.

Advantageously, in accordance with the present invention, segments of the individual track pairs are associated with rotational angles of the shaft of the fuel injection pump and drive shaft of the internal combustion engine at which high torque peaks occur or in which there is a potential danger of oscillation for the injection timer as a result of resonance.

Advantangeously, the track pairs having displacement curves which differ from the curves of the other track pairs include a plurality of segments with a slope that causes an automatic locking or suppression with the segments located therebetween having an extremely great or high slope. When at least two track pairs are provided in the injection timer, an automatic locking over an entire adjustment range may be alternately ensured in the injection timer.

In accordance with the present invention, the other track pairs of the injection timer may be provided with a slope such that a sufficient rotational angle is produced. If a torque exceeds a value which is permissible for an existing frictional limit, the torque peaks will be handled by the oscillating bodies or flyweights with an automatic self-locking or suppression so that there is no longer any displacement of the flyweights or oscillating bodies and no associated change in the displacement characteristics. Consequently, it is not necessary to provide a larger installation space for the injection timer so that a solution as proposed by the present invention may readily be installed or retrofitted to existing internal combustion engines.

Accordingly, it is an object of the present invention to provide a fuel injection timer which avoids, by simple means, shortcomings and disadvantages encounter in the prior art.

Another object of the present invention resides in providing a fuel injection timer for an internal combustion engine which functions reliably under all load conditions of the engine.

Yet another object of the present invention resides in providing a fuel injection timer for an internal combustion engine which is capable of producing a large rotatonal angle between a shaft of a fuel injection pump and a drive shaft connected to the engine.

A still further object of the present invention resides in providing a fuel injection timer for an internal combustion engine which ensures a proper injection of the fuel so as to provide a favorable combustion cycle for the engine.

Another object of the present invention resides in providing a fuel injection timer for an internal combustion engine which ensures a selflocking between a shaft of a fuel injection pump and a shaft connected to the internal combustion engine over an entire adjustment range of the timer.

These and other objects, features and advantages of the present invention will become more apparent from the following description when taken in connection with the accompanying drawing which shows, for the purposes of illustration only, one embodiment in accordance with the present invention, and wherein:

DETAILED DESCRIPTION OF THE PREFERRED EMBODIMENTS

Figure 1:
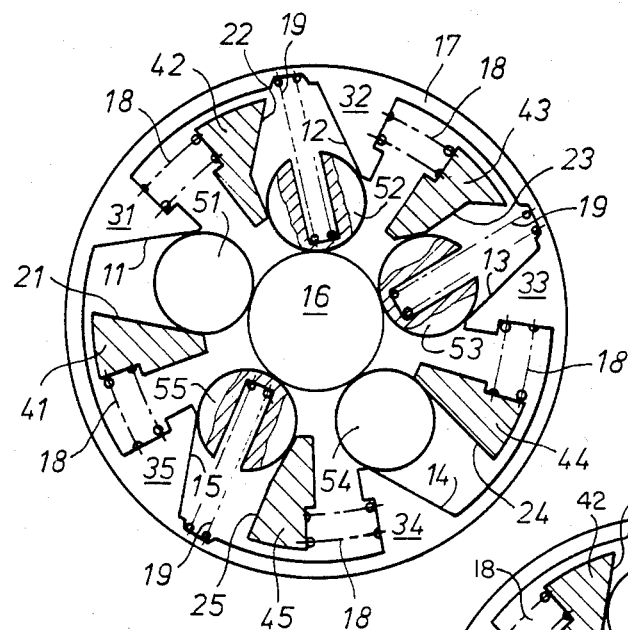
FIG. 1 is a cross-sectional view of an injection timer constructed in accordance with the present invention illustating a relationship between the components of the injection timer with an associated internal combustion engine operating at low rotational speed.

Referring now to the drawings wherein like reference numerals are used throughout the several views to designate like parts and, more particularly, to FIG. 1, according to this Figure, an injection timer includes a plurality of supports 31, 32, 33, 34, 35 on which are respectively disposed first tracks 11, 12, 13, 14, 15, with the tracks 11–15 and supports 31–35 being permanently linked with a drive shaft 16 by a housing 17. Each of the first tracks 11–15 is respectively associated with one second track 21, 22, 23, 24, 25, with the first tracks 11–15 and second tracks 21–25 together forming track pairs. The second tracks 21–25 are respectively disposed on supports 41, 42, 43, 44, 45, with the tracks 21–25 and supports 41–45 being permanently linked to a shaft (not shown) of a fuel injection pump (not shown) of an internal combustion engine (not shown). Oscillating bodies or flyweights 51, 52, 53, 54, 55 are each respectively disposed between the track pairs 11/21, 12/22, 13/23, 14/24, and 15/25, with springs 18 being respectively disposed and acting between the supports 31–35 and 41–45 of the tracks 11–15 and 21–25. The oscillating bodies 52, 53 and 55 are controlled in their abutment with a portion of the housing 17 through additional springs 19. A drive torque for the injection pump is transmitted from the drive shaft 16 to the housing 17 and the supports 31–35 with tracks 11–15. The drive torque is, in turn, transmitted from the tracks 11–15 to the oscillating bodies 51–55, through tracks 21–25 to supports 41–45 and thus to the shaft of the injection pump.

Figure 2:
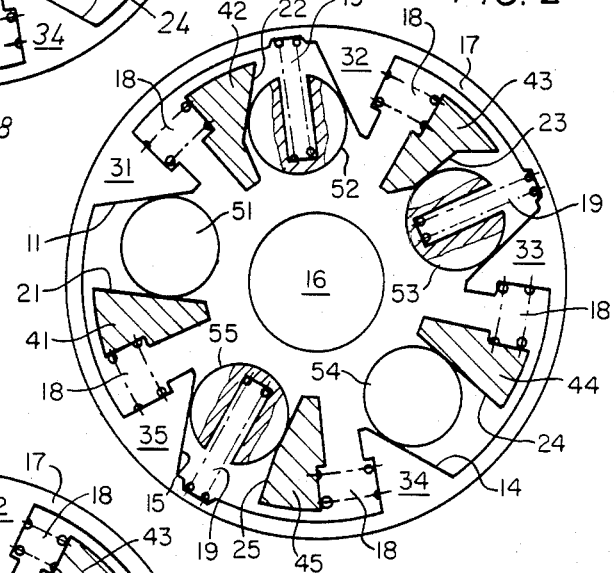
FIG. 2 is a cross-sectional view of the injection timer of FIG. 1 illustrating a relationship between the components of the injection timer with the engine at a medium rotational speed.
Figure 3:
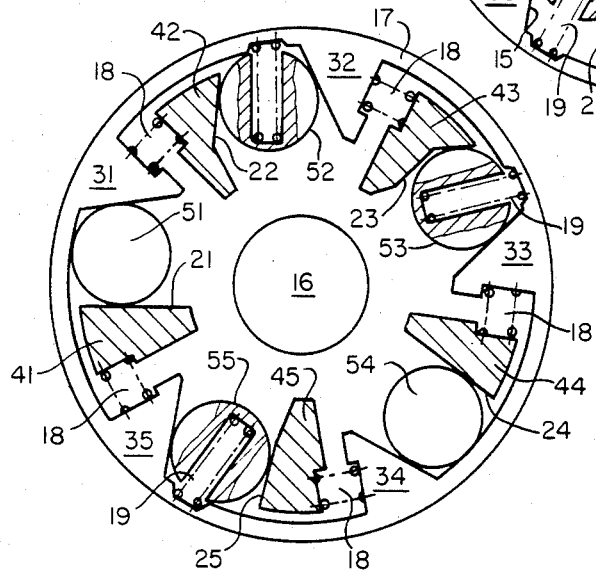
FIG. 3 is a cross-sectional view of the injection timer of FIG. 1 illustrating a relationship between the components of the injection timer, with an engine operating at a maximum rotational speed.

Under the influence of centrifugal forces, the oscillating bodies 51–55 move from an inner end position of FIG. 1 at a low rotational speed of the internal combustion engine (FIG. 1) through a middle position for a medium rotational speed of the engine (FIG. 2), to an outer end position and a maximum rotational speed of the engine (FIG. 3) against a force of the springs 18 and 19. As a result of the slope provided on the tracks 11–15 and 21–25, the oscillating bodies 51–55 effect a relative rotation between the drive shaft 16 and the shaft of the fuel injection pump in such a fashion that an earlier initiation of the fuel injection occurs at higher rotational speeds of the engine.

While the track pairs 11/21 and 14/24 are provided in the usual fashion with a continuous slope, the track pairs 12/22, 13/23, and 15/25 have a slope which is non-uniform over their displacement path, whereby a segment of the displacement path is constructed to have a slight slope thereby causing a self-locking between the tracks and the corresponding oscillating bodies 51–55. This segment is associated with a torsional anle for the shafts for low engine rotational speeds for the track pair 12/22, with a torsional angle of the shafts for a medium rotational speed for the track pair 13/23, and with a torsional angle or rotation of the shafts for a maximum engine rotational speed for the track pair 15/25.

In the illustrated example, the track pair 15/25 is provided for high torque peaks at a high fuel filling volume, while the track pairs 12/22 and 13/23 are provided to avoid oscillations caused by resonances.

The slope of the tracks 11–15 and 21–25 is constructed so that a twisting or rotation of the shafts 16 and shaft of the fuel injection pump which results from a cooperation of all the tracks 11–15 and 21–25 and oscillating bodies 51–55 exactly corresponds to a displacement curve required for a satisfactory combustion cycle of the internal combustion engine. Because of the segments of tracks 22, 23 and 25 with automatic self-locking or suppression, no consideration need be given to a locking between the usual tracks 21, 24 and the oscillating bodies 51, 54.

The springs 18 counteract the centrifugal force of the oscillating bodies 51–55 and force the oscillating bodies 51–55 back into the initial position shown in FIG. 1 when the rotational speed of the engine decreases. The force of the springs 19 is required only in the automatic self-locking or supression range of the displacement path of the oscillating bodies 52, 53 and 55 because automatic suppression or self-locking prevents a displacement as a result of the forces which act through the tracks 22, 23, 25 upon the oscillating bodies 52, 53, 55.

While I have shown and described only one embodiment in accordance with the present invention, it is understood that the same is not limited thereto but is susceptible of numerous changes and modifications as known to a person skilled in the art, and I therefore do not wish to be limited to the details shown and described herein but intend to cover all such changes and modifications as are obvious to one of ordinary skill in the art.

I claim:

1. A fuel injection timer for an internal combustion engine, the timer being adapted to cause a relative rotation between a shaft of a fuel injection pump and a drive shaft connected to the internal combustion engine as a function of a rotational speed of the internal combustion enine, the timer comprising a plurality of first track means adapted to be connected to the drive shaft, a plurality of second track means adapted to be connected to the shaft of the fuel injection pump, the first and second track means being disposed in opposed pairs, oscillating means arranged between each pair of track means for transmitting drive torque for the fuel injection pump, the oscillating means being adapted to be displaced from a radially inner end position at a low rotational speed of the engine to a radially outer end position at a maximum rotational speed of the engine under an influence of centrifugal forces and spring forces, each pair of track means having a predetermined slope pattern for defining a displacement path for the oscillating means and for effecting relative rotation between the shaft of the injection pump and the drive shaft, the slope pattern of at least some of the opposed pairs of track means being nonuniform and including at least one segment having a slope pattern for enabling an automatic self-locking between the at least some pairs of opposed track means and the associated oscillating means, each at least one segment of the at least some pairs of opposed track means being associated with different rotational angles of the drive shaft and shaft of the fuel injection pump at which one of high torque peaks and oscillation caused by resonance occur, one of the track means of the at least some pairs of opposed track means including a plurality of segments having a slope pattern for enabling the automatic self-locking, at least one further segment having an extremely steep slope pattern disposed between the segments having a slope pattern for enabling the automatic self-locking, said at least some pairs of the opposed track means including at least two pairs of opposed track means arranged so as to effect an automatic self-locking between the drive shaft and shaft of the injection pump over an entire adjustment range of the injection timer.

2. A fuel injection timer according to claim 1, wherein one of the track means of the at least some pairs of opposed track means includes a plurality of segments having a slope pattern for enabling the automatic self-locking, at least one further segment having an extremely steep slope pattern disposed between the segments having a slope pattern for enabling the automatic self-locking.

3. A fuel injection timer according to claim 2, wherein at least some pairs of the opposed track means include at least two pairs of opposed track means arranged so as to effect an automatic self-locking between the drive shaft and shaft of the injection pump over an entire adjustment range of the injection timer.

4. A fuel injection timer according to one of claim 1, characterized in that each of the segments having a slope pattern for enabling an automatic self-locking is a segment having a slight slope.

5. A fuel injection timer for an internal combustion engine, the timer being adapted to cause a relative rotation between a shaft of a fuel injection pump and a drive shaft connected to the internal combustion enine as a function of a rotational speed of the internal combustion engine, the timer comprising a plurality of first track means adapted to be connected to the drive shaft, a plurality of second track means adapted to be connected to the shaft of the fuel injection pump, the first and second track means being disposed in opposed pairs, oscillating means arranged between each pair of track means for transmitting drive torque for the fuel injection pump, the oscillating means being adapted to be displaced from a radially inner end position at a low rotational speed of the engine to a radially outer end position at a maximum rotational speed of the engine under an influence of centrifugal forces and spring forces, each pair of track means having a predetermined slope pattern for defining a displacement path for the oscillating means and for effecting relative rotation between the shaft of the injection pump and the drive shaft, the slope pattern of at least some of the opposed pairs of track means being non-uniform and including at least one segment having a slope pattern for enabling an automatic self-locking between the at least some pairs of opposed track means and the associated oscillating means, each at least one segment of the at least some pairs of opposed track means being associated with different rotational angles of the drive shaft and shaft of the fuel injection pump at which one of high torque peaks and oscillation caused by resonance occur, wherein each segment having a slope pattern for enabling an automatic self-locking is of a slight slope.

* * * * *